Figure 1:
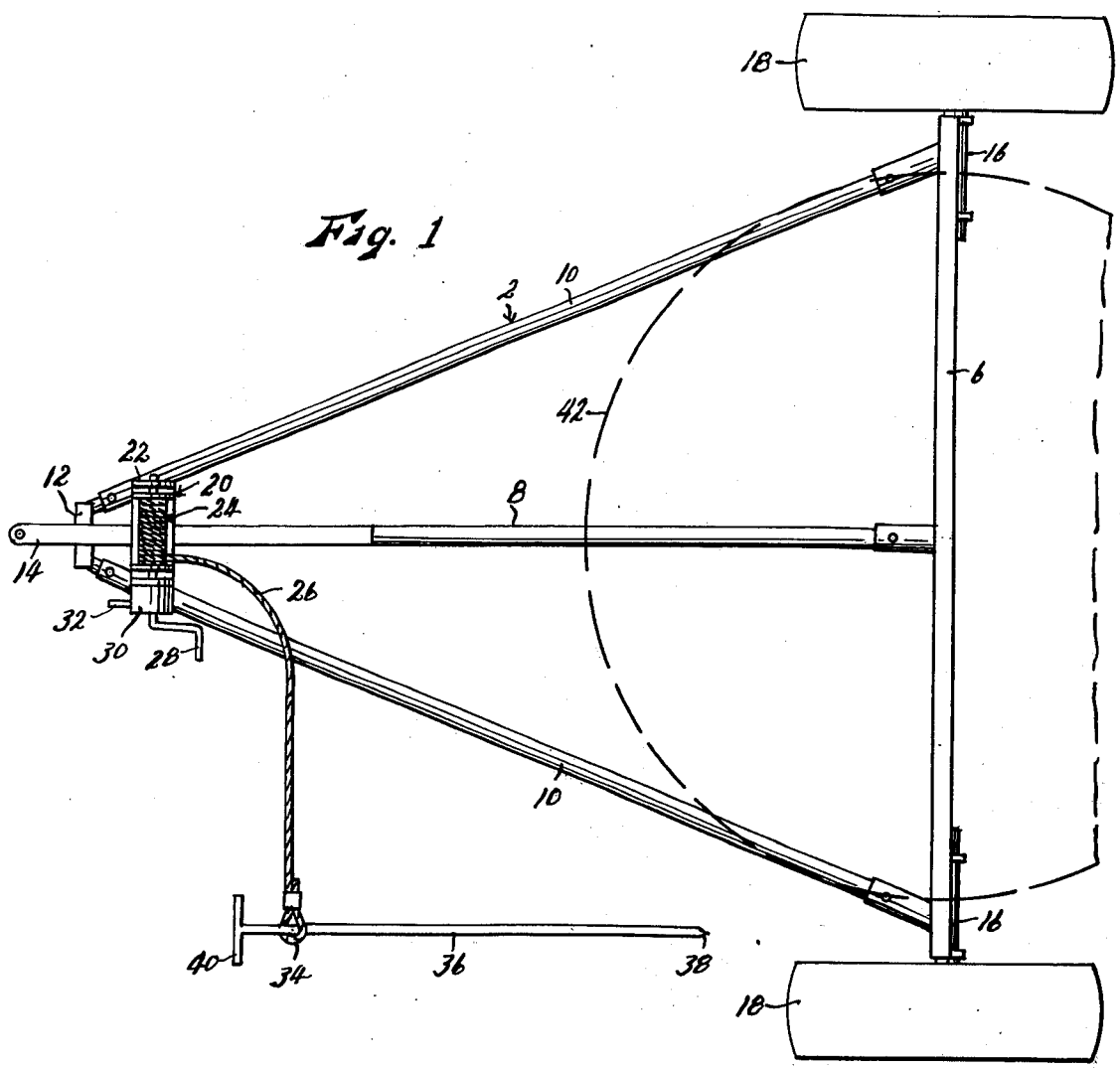

United States Patent [19]
Youngkamp

[11] 3,964,621
[45] June 22, 1976

[54] BALE LIFTER AND CARRIER
[75] Inventor: John H. Youngkamp, Sedalia, Mo.
[73] Assignee: Leland B. Bock, Sedalia, Mo.
[22] Filed: Jan. 27, 1975
[21] Appl. No.: 544,405

[52] U.S. Cl............................ 214/85.5; 214/DIG. 4
[51] Int. Cl.² .............................................. B60P 1/00
[58] Field of Search .......... 214/501, 500, 505, 85.5, 214/DIG. 3, DIG. 4, 517; 294/78 R

[56] References Cited
UNITED STATES PATENTS
| | | | |
|---|---|---|---|
| 1,012,139 | 12/1911 | King................................... | 214/85.5 |
| 2,547,601 | 4/1951 | Scheirer............................. | 214/85.5 |
| 3,357,579 | 12/1967 | Goodsell............................ | 214/501 |

Primary Examiner—Albert J. Makay
Attorney, Agent, or Firm—John A. Hamilton

[57] ABSTRACT

A lifter and carrier for large cylindrical bales of hay consisting of a flat, wheeled bed adapted to be transported by a towing vehicle, and having a horizontal rearward edge spaced above the ground, and a cable winch carried by the bed, the cable of the winch having at its extended end a device adapted to be secured in a hay bale resting on the ground, whereby the bale may be tilted upwardly and forwardly over the rearward edge of the bed to be supported and secured on the bed.

1 Claim, 5 Drawing Figures

BALE LIFTER AND CARRIER

This invention relates to new and useful improvements in bale lifters and carriers, and has particular reference to a device for lifting and carrying large cylindrical bales of hay. In recent years, the use of large bales has become increasingly popular for a variety of reasons, a very common size being of a cylindrical shape perhaps 6 feet in diameter, 6 feet in axial length, and weighing perhaps a ton or more. However, whatever advantage bales of this size may have, a common problem associated with their use has been the handling and transportation thereof, since their size and weight clearly rule out manual handling thereof. Principally, these difficulties are concerned with the lifting of the bales from the ground to an elevated position supported by a transporting vehicle, this lifting operation generally heretofore having required some sort of power driven hoisting apparatus, which of course is a relatively complicated expedient, as well as being disadvantageously expensive.

Accordingly, the primary object of the present invention is the provision of a bale lifting and carrying device wherein a bale is lifted to and secured on the bed of the carrying vehicle by a simple pulling mechanism, which may be a common cable winch, and which may be operated manually. Generally, this is accomplished by the provision of a carrier vehicle bed which is essentially horizontal and planar and which has an exposed edge at an elevation above the ground less than half of the height of the bale as it rests on the ground, the cable of the winch being attachable to the bale at a point effectively well above the bed and operable to pull the bale toward the bed, whereby the bale is rocked upwardly over said exposed edge of the bed to an elevated position on the bed.

Another object is the provision of a bale lifter and carrier of the character described having a novel means for attaching the winch cable to the bale, the use of which is extremely simple and rapid, and which is extremely secure, which will not tear or damage the bale, and which will not be released by cable tension.

Other objects are simplicity and economy of construction, and efficiency and dependability of operation.

Figure 2:
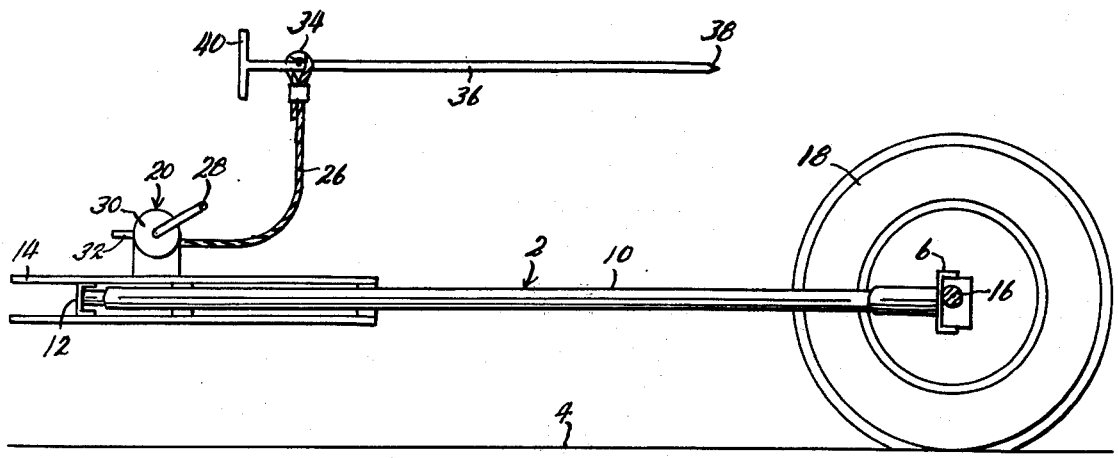
Figure 3:
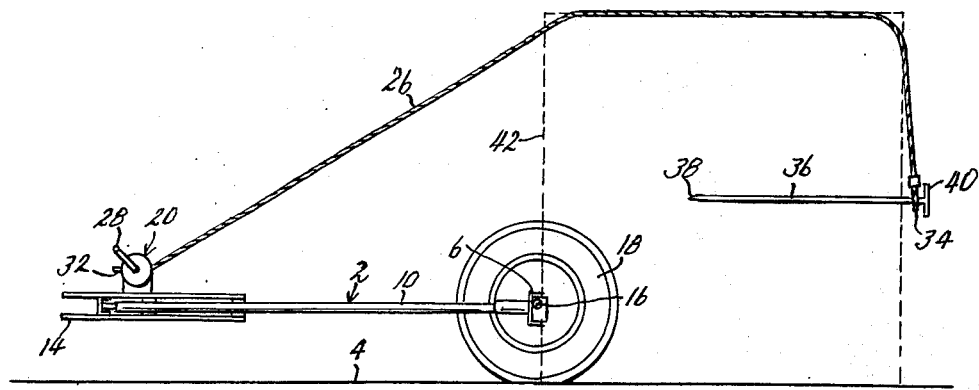
Figure 4:
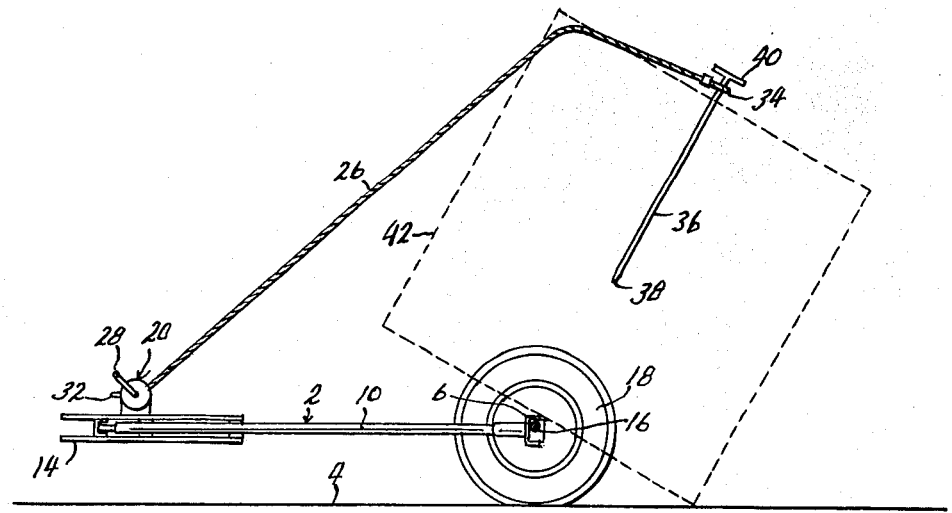
Figure 5:
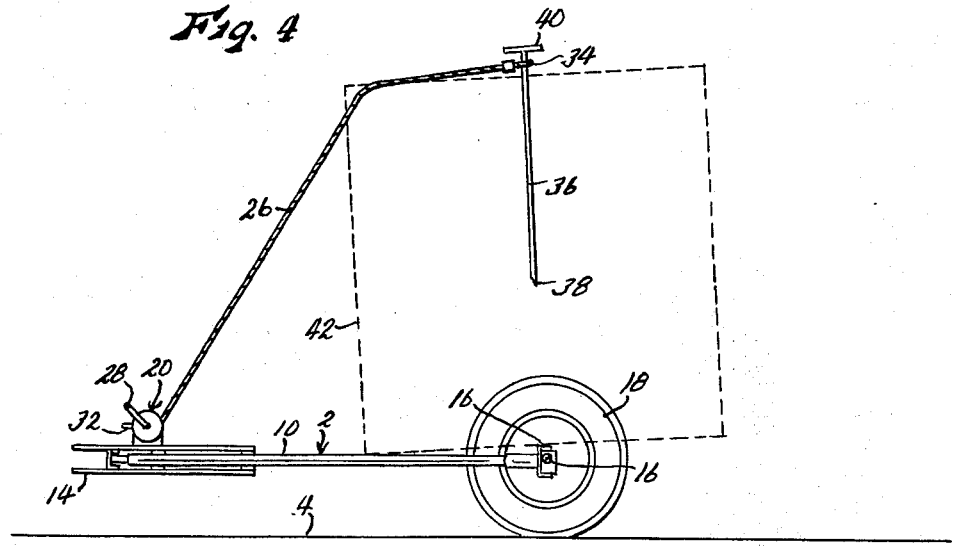

With these objects in view, as well as other objects which will appear in the course of the specification, reference will be had to the accompanying drawing, wherein:

FIG. 1 is a top plan view of a bale lifter and carrier embodying the present invention, with the position of a bale of hay carried thereby being indicated in dotted lines, FIG. 2 is a side elevational view of the bale lifter and carrier shown in FIG. 1, with the near side wheel removed, and FIGS. 3, 4 and 5 are reduced views similar to FIG. 2, showing a bale of hay in dotted lines at successive stages in the loading thereof onto the carrier.

Like reference numerals apply to similar parts throughout the several views, and the numeral 2 applies generally to the bed of the bale lifter and carrier contemplated by the present invention. Said bed is generally planar and is normally disposed horizontally above ground level 4, and consists of a transversely extending rear axle bar 6, a central bar 8 affixed at its rearward end to the midpoint of axle bar 6 and extending forwardly, and a pair of side bars 10 affixed at their rearward ends to axle bar 6, respectively adjacent opposite ends thereof, and converging forwardly to be connected rigidly to the forward end of central bar 8 by fixture 12. At its forward end, the bed has affixed thereto a tongue 14 which is connectable to a tractor or other towing vehicle. Affixed to each end of axle bar 6 is an outwardly extending axle 16, on the extended end portion of which a ground-engaging wheel 18 is rotatably mounted. Said wheels are coaxial, and support bed 2 above ground level 4.

Mounted on the forward end portion of bed 2 is a cable winch 20 including a fixed bracket 22, affixed for example to tongue 14, in which is rotatably mounted a cable drum 24 on which is wound a cable 26. Said drum is rotatable manually by means of a crank 28, through a geared drive indicated at 30. It will be understood that said drum may be turned in either direction, and may be selectively released or locked at any desired position by means under the control of a lever 32. Such cable winches are common and well known in the art, and accordingly no detailed explanation of the operation thereof appears here. An eye 34 is secured in the free end of cable 26, and a rod 36 is inserted loosely through said eye. Said rod is perhaps 4 feet long, being pointed at one end 38, and having a T-head 40 at its opposite end which is too large to pass through said eye.

In the use of the device as shown and described, bed 2 is first positioned with axle bar 6 thereof closely adjacent or against a cylindrical bale 42 of hay or the like resting on the ground, preferably one of the round ends of the bale, as shown. This positioning is accomplished by maneuvering the towing vehicle to which tongue 14 of the bed is attached. Axle bar 6 is preferably disposed as close to the ground as is practical, for easy movement thereof over rough terrain, in order to minimize the work of lifting the bale to the bed. As shown, said axle bar has its top surface perhaps 12–14 inches above ground level. In any event, its elevation above the ground should be less than one-half the height of the bale as said bale rests on the ground, this height being approximately 6 feet in the bales this device is designed to handle. Cable 26 is then extended by rotation of winch drum 24 until the pointed end 38 of rod 36 can be inserted horizontally and centrally into the end of the bale distal from axle bar 6 of the bed, as shown in FIG. 3. If this is a round end of the bale, as preferred, rod 36 will then be disposed substantially axially in the bale. The cable is trained over the top of the bale as shown.

Cable 26 is then retracted by operation of crank 28, so that bale 42 is initially pulled tightly against axle bar 6. Tension of the cable causes it to indent the bale, as indicated, so that there is no danger the cable will slip from the top of the bale at this time. Further retraction of the cable will, by virtue of the fact that said cable is pulling from the top front "corner" of the bale, which is well above the axle bar, then cause the bale to tilt forwardly over the axle bar 6, as shown in FIG. 4, and then upwardly over said axle bar to rest on bed 2, as shown in FIG. 5. During the forward tilting movement shown in FIG. 4, the bale will slip or slide rearwardly relative to axle bar 6 until said axle bar is disposed substantially along a diametric midline of the circular lower end of the bale, this being its position as shown in FIG. 4. From this point on, however, the bale will simply tilt over the axle bar as an axis, without slipping laterally of said axle bar, until it reaches the FIG. 5 position, wherein it is supported by said axle bar, and by central bar 8 and possibly side bars 10 of the bed, as indicated in FIG. 1. The cable is then secured by locking drum 24 of the winch.

The bale may then be transported freely, even at considerable speeds over rough terrain. Even though it is generally balanced on the axle bar, it cannot tilt rearwardly due to the restraint of cable 26, cannot tilt forwardly due to the supports of its forward portion by the bed, and cannot tilt laterally because it is supported across the entire lateral width of its broad, generally flat base by the axle bar and bars 8 and 10. However, it may be unloaded from the carrier very easily, despite its great weight, simply by extending the cable and tilting the bale rearwardly. This rearward tilting can be accomplished very easily by hand, once the cable is released, because the bale is virtually balanced on the narrow transverse width of the axle bar.

It will be noted in FIGS. 3 and 4 that the tension of cable 26 tends to place the bale in compression against the axle bar, so that there is virtually no danger that the cable tension will pull apart, break up or otherwise damage the bale. Also, the loading operation exerts substantially no forces tending to cause the carrier to move over the ground on wheels 18, making possible easy loading even when the carrier is not attached to a towing vehicle. It will be seen also that since the pull of cable 26 is always transverse to pointed rod 36, there is no danger that cable tension will withdraw the rod from the bale. As long as the bar is sufficiently long (4 feet has been found ample), and is inserted deeply enough into the bale, it will provide an amply secure anchor for the cable and will not cause breakage or damage to the bale.

While I have shown and described a specific embodiment of my invention, it will be readily apparent that many minor changes of construction and operation could be made without departing from the spirit of the invention.

What I claim as new and desire to protect by Letters Patent is:

1. A lifter and carrier for large bales of hay or the like each having, when resting on the ground, generally planar and vertical end surfaces of a generally uniform height, said lifter and carrier comprising:

a. a generally planar, horizontal wheeled bed having a generally straight, horizontal exposed edge spaced above ground level at a height less than one half that of said bales, said exposed bed edge being adapted by movement of said bed to be disposed against one end surface of one of said bales, b. a cable winch carried by said bed remotely from said exposed bed edge, and including a cable extendable over said exposed bed edge, and over said bale to the opposite end of said bale, c. anchor means operable to secure the extended end of said cable to said opposite end of said bale, whereby as said cable is retracted by said winch, said bale will first be pulled against said exposed edge of said bed, and then tilted upwardly and inwardly over said exposed edge to be lifted to and supported by said bed, and whereby as said bale is tilted over the exposed edge of said bed, it will slip downwardly laterally of said edge to a position wherein it is generally balanced on said edge when tilted sufficiently to rest on said bed, said anchor means comprises an elongated rod adapted to be inserted horizontally into said opposite end of said bale and to project therefrom, the free end of said cable being attached to the projecting end portion of said rod, and d. means operable to lock said cable winch at any desired extension of said cable therefrom.

* * * * *